United States Patent
Zakrewski

(10) Patent No.: US 7,010,421 B2
(45) Date of Patent: Mar. 7, 2006

(54) WIRELESS IGNITION KILL SWITCH CONTROLLED BY A SECURITY SYSTEM

(75) Inventor: David S. Zakrewski, Babylon, NY (US)

(73) Assignee: Honeywell International, Inc., Morristown, NJ (US)

( * ) Notice: Subject to any disclaimer, the term of this patent is extended or adjusted under 35 U.S.C. 154(b) by 35 days.

(21) Appl. No.: 10/871,266

(22) Filed: Jun. 17, 2004

(65) Prior Publication Data

US 2005/0283302 A1 Dec. 22, 2005

(51) Int. Cl.
*G06F 19/00* (2006.01)

(52) U.S. Cl. .................................. 701/114; 123/198 D

(58) Field of Classification Search ................ 701/114, 701/115; 123/198 D
See application file for complete search history.

(56) References Cited

U.S. PATENT DOCUMENTS

| | | | | |
|---|---|---|---|---|
| 4,887,064 A | * | 12/1989 | Drori et al. ................. | 340/5.23 |
| 5,157,375 A | * | 10/1992 | Drori ......................... | 340/429 |
| 5,225,713 A | * | 7/1993 | Henneberry et al. ....... | 307/10.2 |
| 5,365,235 A | * | 11/1994 | Kennedy et al. .......... | 340/10.34 |
| 5,381,128 A | * | 1/1995 | Kaplan .................... | 340/426.17 |
| 5,481,253 A | * | 1/1996 | Phelan et al. .............. | 340/5.67 |
| 5,684,454 A | * | 11/1997 | Nishioka et al. ........ | 340/426.12 |
| 5,769,051 A | * | 6/1998 | Bayron et al. ............... | 123/335 |
| 5,774,043 A | * | 6/1998 | Mizuno et al. ......... | 340/426.35 |
| 5,803,043 A | * | 9/1998 | Bayron et al. ............... | 123/335 |
| 6,188,326 B1 | * | 2/2001 | Flick ...................... | 340/825.69 |
| 2002/0145535 A1 | * | 10/2002 | Flick ...................... | 340/825.69 |
| 2003/0142849 A1 | * | 7/2003 | Lemelson et al. .......... | 382/104 |
| 2004/0234109 A1 | * | 11/2004 | Lemelson et al. .......... | 382/118 |

* cited by examiner

*Primary Examiner*—John T. Kwon
(74) *Attorney, Agent, or Firm*—John Beninati; Robert S. Smith

(57) ABSTRACT

A method of protecting an asset having engine which includes the steps of providing a kill switch cooperating with the engine on the asset, providing a communications receiver connected to the kill switch, providing a security system having a security panel for a protected premises, providing a communications transmitter connected to the security panel, and transmitting a signal sequentially from the security panel to the transmitter, then to the receiver and then to the kill switch.

The invention also includes apparatus for protecting an associated asset having engine which includes a kill switch cooperating with the engine on the associated asset, a communications receiver connected to the kill switch, a security system having a security panel for an associated protected premises, and a communications transmitter connected to the security panel. The apparatus thereby allows a signal to be transmitted sequentially from the security panel to the transmitter, then to the receiver and then to the kill switch to cause operation of the kill switch.

43 Claims, 2 Drawing Sheets

WIRELESS IGNITION KILL SWITCH CONTROLLED BY A SECURITY SYSTEM

BACKGROUND OF THE INVENTION

The invention relates to security systems and particularly to the combination of security systems for residential commercial buildings as well as security systems for automobiles and other apparatus such as construction equipment. Automobiles are often stolen from the driveways of the homes of the user as well as from the garages of the homes of the user. In more urban environments automobiles are stolen from parking places along city streets. Some automobiles may be equipped with manually operated kill switches. Manually operated kill switches require the user to remember to select the correct switch position upon departing from the automobile. Other automobiles may be equipped with kill switches that respond to the occurrence of an alarm by the vehicle security system. Such systems require the user to alarm the security system when leaving is motor vehicle.

While present invention may be described primarily in terms of cars, it will be understood that it also has application to trucks and other equipment such as construction industry equipment. Such equipment is also vulnerable to theft. The term "asset" will be used herein to collectively refer to automobiles and such other equipment.

As used herein, the term "kill switch" means, in the case of a spark-ignition engine, a complete ignition system shut off. More specifically, the shut off is usually achieved by breaking or grounding the ignition and may also include shutting off any electric fuel pumps. In the case of a diesel engine the term "ignition kill" means an air shut off which may be spring-loaded to the off position. Some vehicles include a kill switch that, when enabled, disables the vehicle computer. For example, the kill switch may put the vehicle computer into a sleep mode and the vehicle will not start.

SUMMARY OF THE INVENTION

It is an object of the present invention to provide a system and method for securing assets located both within and/or adjacent to a protected premises.

Another object the present invention is to provide apparatus which will prevent the operation of an asset that includes an engine.

Still another object the present invention is to provide apparatus that may be redundant with automobile security systems and thus will insure that should a user forget to arm one security system; the asset will not be left completely without protection.

It has now been found that these and other objects of the invention may be attained in a method of protecting an asset having engine which includes the steps of providing a kill switch cooperating with the engine on the asset, providing a communications receiver connected to the kill switch, providing a security system having a security panel for a protected premises, providing a communications transmitter connected to the security panel, and transmitting a signal sequentially from the security panel to the transmitter, then to the receiver and then to the kill switch.

In some forms of the method the signal activates the kill switch to prevent operation of the engine. Various other forms of the method used the signal to deactivate the kill switch to allow operation of the engine. The method may also include not just providing a communications receiver and providing a communications transmitter but includes providing a radio frequency communications receiver and a radio frequency communications transmitter. Similarly, the step of providing a kill switch on the asset may include providing a kill switch on an asset intended for operation on a highway. In some cases the asset may be a car, truck, or mobile construction equipment.

In some cases the method includes positioning the asset within protected premises or outside of protected premises. Some forms of the method include a step of providing a kill switch cooperating with the engine which further includes providing a kill switch that causes an ignition shut off.

The step of providing a kill switch cooperating with the engine on the asset may include providing a kill switch that breaks an ignition circuit, grounds an ignition circuit, shuts off an air intake, or shuts off an electric fuel pump. In some forms of the method the step of providing a kill switch cooperating with the engine on the asset includes providing a kill switch that operates in series with a discrete manual kill switch on the asset or a discrete kill switch operated by a vehicle security system. In some forms of the method the step of providing a kill switch cooperating with the engine on the asset includes (1) providing a kill switch that operates a relay that is also operated by a vehicle security system or (2) providing a kill switch cooperating with the engine on the asset includes providing a kill switch that operates a relay that is also operated by a discrete manual switch. In some forms of the method the kill switch makes a vehicle computer inoperative or puts the computer into sleep mode so the vehicle will not start.

The invention also includes apparatus for protecting an associated asset having engine which includes a kill switch cooperating with the engine on the associated asset, a communications receiver connected to the kill switch, a security system having a security panel for an associated protected premises, and a communications transmitter connected to the security panel. The apparatus thereby allows a signal to be transmitted sequentially from the security panel to the transmitter, then to the receiver and then to the kill switch to cause operation of the kill switch.

In some forms of the apparatus the signal to the kill switch prevents operation of the engine and/or deactivates the kill switch to allow operation of the engine. The communications receiver and said communications transmitter may be respectively a radio frequency communications receiver and a radio frequency communications transmitter. The kill switch may be installed on an asset intended for operation on a highway such as a car, truck or piece of construction equipment.

In some cases the apparatus is configured to be functional when they asset is positioned within or outside of a protected premises. The kill switch may cause an ignition shut off, breaks an ignition circuit, ground an ignition circuit, shuts off an air intake or shuts off an electric fuel pump.

The kill switch may be connected in series with a manual kill switch on the asset or connected in series with a discrete kill switch operated by a vehicle security system. In some cases the kill switch operates a relay that may be also operated by a vehicle security system or a discrete manual switch. In other cases the kill switch is connected in parallel with a discrete kill switch operated by vehicle security system or in parallel with another kill switch that is manually operated. In other embodiments kill switch cooperates with an associated computer in the vehicle to place the computer in a sleep mode.

BRIEF DESCRIPTION OF THE DRAWING

The invention will be better understood by reference the accompanying drawing in which.

DESCRIPTION OF THE PREFERRED EMBODIMENTS

Figure 1:
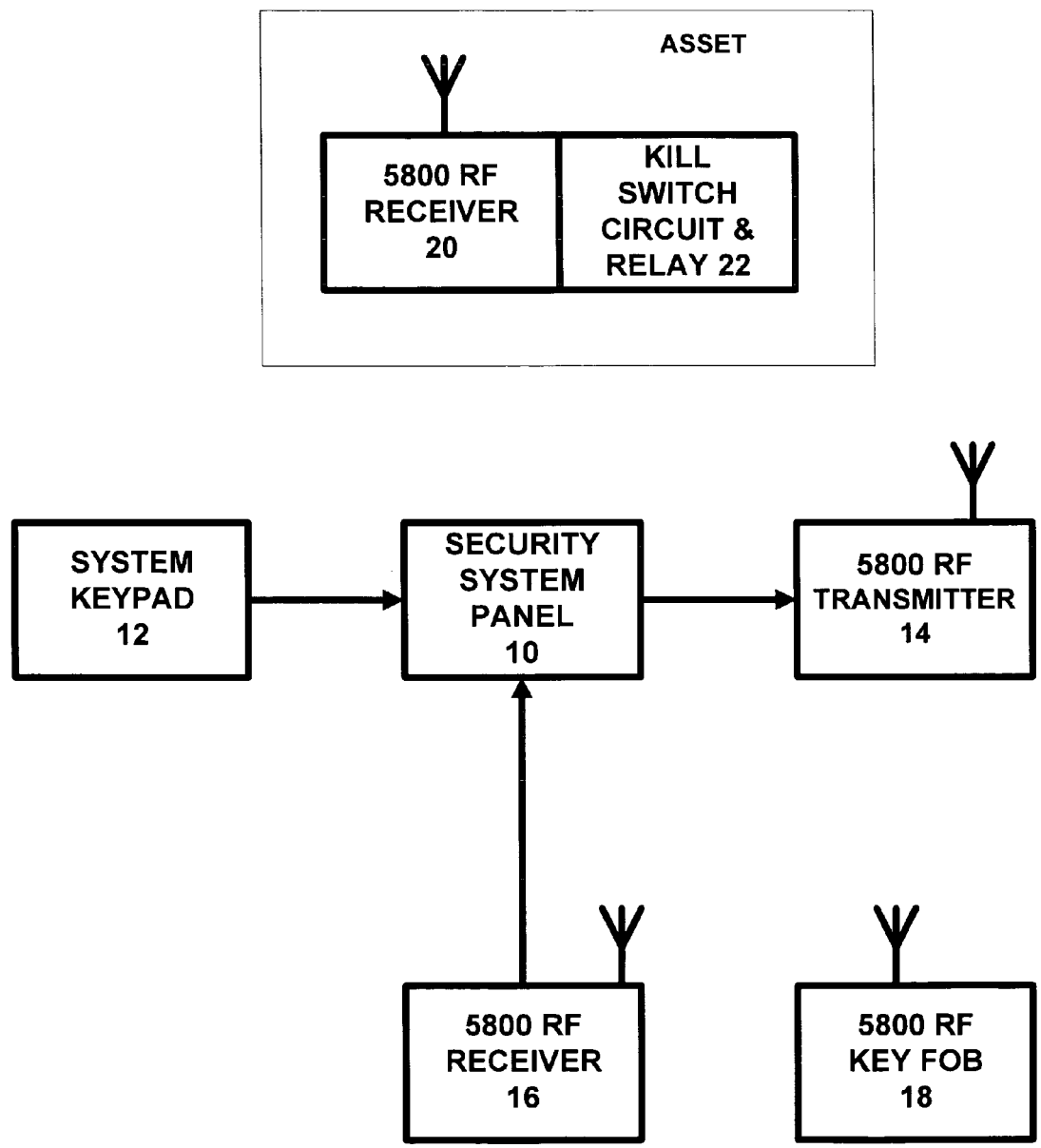
FIG. 1 is a schematic of a security system for protected premises that includes a radio frequency key fob that communicates via radio frequency with an ignition kill switch on a protected asset.
Figure 2:
FIG. 2 is a schematic of a serial kill switch arrangement within a protected asset.
Figure 3:
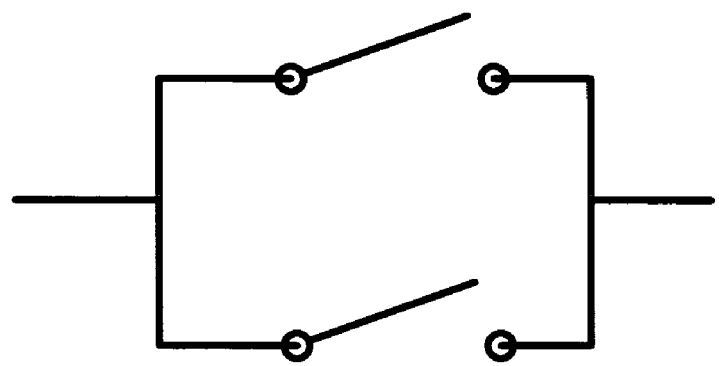
FIG. 3 is a schematic of a parallel kill switch arrangement within a protected asset.

The problem of securing a motor vehicle including cars, trucks and other mobile apparatus has been given much attention. Common approaches include:

1. A disabler switch or "kill switch" prevents a thief from starting the car or a fuel switch which stops the fuel supply.

2. Anti-Theft Bars or Steering Wheel Locking Devices prevent the steering wheel from bieng turned. They are highly visibile and may act as a deterent from theft.

3. Armored Collar is a metal shield that locks around the steering column and covers the ignition, the starter rod, and the steering wheel interlock rod.

4. Crook Lock is a long metal bar that has a hook on each end to lock the steering wheel to the brake pedal.

5. Tire Locks make the car nearly impossible to move.

Any device can be defeated by a determined thief if he/she is given enough time to operate undetected. The typical car alarm is equipped with motion sensors, impact sensors and a loud siren or series of tones. A current listing of alarms includes the Audible Alarm, Motion Detector, Current Sensor, Computerized Ignition Immobilizer, Sight and Sound Computerized Alarm and Silent Paging System. The best alarms activate themselves automatically when you leave the vehicle and include an automatic kill switch. The best models also flash the headlights and honk the horn in addition to sounding a siren.

There are a variety of central station systems intended for homeowners, business owners, and other potential targets for burglary, that are monitored by a central station. These systems are vastly superior to older systems that merely sound a bell or alarm. They have also largely replaced systems that were tied in directly to the local police station. As the use of burglar alarms increased, the local police departments began turning down more and more requests to be "hooked-up." As a result, there became a demand for central stations, or companies whose specialty it was to simply monitor burglar alarms. Most police departments will still allow banks and large jewelry stores a direct link to the police station, but as a rule, homeowners are excluded. So as the demand for security has risen, many guard agencies and burglar alarm installers have begun to offer centralized monitoring as an option for their clients.

When such systems are installed, it is common for them to be connected by a dedicated telephone line to the central station. Other systems utilize radio frequency and the internet to connect to the central station. In event of an intrusion, the control panel on the premises being monitored calls up to the central station. In the event of an intrusion, the control panel (also know as a security panel) on the premises being monitored calls up the central station and gives an electronic message to the answering computer. It tells the computer exactly which switch or sensor has been violated, and the computer then tells the operator what has happened. For example if a burglar enetered through a broken window, the panel would connect with the computer up and tell it that zone 4, a first floor window, has been broken. The operator would then see on his computer screen that Acct. #1234, the Johnson residence has had zone 4, the window foiling on the living room window, violated. As the thief progresses through the house, the panel would call the computer for every sensor that was violated. The operator may then receive 1234-17, meaning that zone 17, a passive Infra-Red dector in the master bedroom, has detected someone. In some case preamplified microphones allow audio monitoring of the protected premises. The operator would then be fairly sure someone was in the house, so the operator would have three options. The operator may just send the companies guards to the scene, call 911 and dispatch the police, or he may send both the police and the guards.

The present invention works in conjunction with a central station system to allow the homeowner or the owner of another protected premise to communicate with a protected asset, typically to operate a kill switch on the protected asset. The communication may be accomplished contemporaneously with an exiting command (i.e. an arming command) for the protected premise security system. In this case the communication is part of a protected premise exiting command (i.e. an arming command). Alternatively the communication may be achieved by the entry of a discrete command, causing the security system to communicate with the automobile or other protected asset, and operate a kill switch and thereby greatly reduce the possibility of the automobile or other protected asset being stolen.

A preferred embodiment of the present invention utilizes devices manufactured and sold by Honeywell and sometimes identified by the designation Ademco wireless radio frequency 5800 series devices. All of the equipment in the 5800 series utilizes a common data format. This common data format is necessary for communication between the respective items in the series. The series includes a four button transmitter, a four button wireless key, a smoke detector, an ultra-small transmitter, a low-temperature transmitter, a recessed or transmitter, a keypad, a bidirectional keypad, a passive infrared detector, a panic pendant, a smoke detector, a mini two-point transmitter, a three-point transmitter, a shock processor and transmitter, a dual technology detector, a wireless watch transmitter, a wireless siren, a heat detector transmitter, a temperature transmitter, a shock processor transmitter, etc. the wide variety of such modules with a common data format is advantageous.

The prior art includes various radio frequency (RF) wireless security systems. Each of the following United States patents describes systems that include illustrative examples utilizing ADEMCO 5800 receivers, transmitters, and standardized data format:

U.S. Pat. No. 6,445,291 Adaptive console for augmenting wireless capability in security systems U.S. Pat. No. 6,243,010 Adaptive console for augmenting wireless capability in security systems U.S. Pat. No. 6,150,936 Method and system for analyzing received signal strength U.S. Pat. No. 6,028,513 Wireless activation of multiple alarm devices upon triggering of a single device All of these patents are incorporated herein by reference. This series of devices also includes site identification and a common data format and/or communications protocol. It is not central to the invention to include site identification and the common data. In other words the method and apparatus of the present invention will have utility even a system that does not include site identification. The inclusion of this site identification, however, insures that the communication between devices is limited to the devices within only a common system. Because the range of such radio frequency devices, used for such applications, ordinarily will be as great as one-mile, it is very desirable that this site identification be included to ensure that the communication is limited to only the devices within a single system.

It will also be understood, however, that the invention is not limited to the use of specific devices in the 5800 series. Other wireless technology and other data formats may be used in the present invention. Although, it is necessary that the respective devices in the apparatus of the present invention must be capable of mutual wireless communication, the communication may be achieved with different signal formats as well as different means including, but not limited to such diverse technologies as infrared and Bluetooth.

Referring now to the drawing, there is shown schematically a security system panel 10 for protected premises. The security system or security system panel 10 receives input from a system keypad 12 as well as a 5800 RF receiver 16. The keypad 12 functions to control the security system panel 10 in the conventional manner. A 5800 radio frequency key fob 18 also provides input via the receiver 16 which is physically attached to the security system panel 10. The key fob 18 may in various embodiments of the invention sequentially arm and disarm the security system panel 10 concurrently with initiating and terminating the kill switch circuit and relay 22. (For convenience, the kill switch circuit and relay 22 will be referred to herein as kill switch 22.) In other embodiments the key fob 18 merely sequentially initiates and terminates the kill switch 22.

A 5800 series radio frequency transmitter 14 is coupled to the security system panel 10. This transmitter 14 produces a radio frequency signal that communicates with a 5800 radio frequency receiver 20 that is coupled to the kill switch 22 located within the asset.

Some embodiments of the present invention will utilize redundant kill switches in addition to any kill switch system that may be manually controlled or associated with an automobile security system. In other embodiments the same kill switch circuitry may be operated by the security system panel 10, a manual switch and/or a vehicle security system. While the preferred embodiment uses radio frequency wireless communication because of the greater range possibilities, those skilled in the art will recognize that other communication means now known or known in the future may be utilized with appropriate receivers and transmitters.

Although the description above contains much specificity, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. The method of protecting an asset having engine which includes the steps of:
   providing a kill switch cooperating with the engine on the asset;
   providing a communications receiver connected to the kill switch;
   providing a security system having a security panel for a protected premises;
   providing a communications transmitter connected to the security panel; and
   transmitting a signal sequentially from the security panel to the transmitter, then to the receiver and then to the kill switch.

2. The method in accordance with claim 1 wherein the signal activates the kill switch to prevent operation of the engine.

3. The method in accordance with claim 1 wherein the signal deactivates the kill switch to allow operation of the engine.

4. The method in accordance with claim 1 wherein the steps of providing a communications receiver and providing a communications transmitter include providing a radio frequency communications receiver and a radio frequency communications transmitter.

5. The method in accordance with claim 1 wherein the step of providing a kill switch on the asset includes providing a kill switch on an asset intended for operation on a highway.

6. The method in accordance with claim 1 wherein the step of providing a kill switch on the asset includes installation on a car.

7. The method in accordance with claim 1 wherein the step of providing a kill switch on the asset includes installation on a truck.

8. The method in accordance with claim 1 wherein the step of providing a kill switch on the asset includes installation on construction equipment.

9. The method in accordance with claim 1 includes positioning the asset within protected premises.

10. The method in accordance with claim 1 includes positioning the asset outside of protected premises.

11. The method in accordance with claim 1 wherein the step of providing a kill switch cooperating with the engine on the asset includes providing a kill switch that causes an ignition shut off.

12. The method in accordance with claim 1 wherein the step of providing a kill switch cooperating with the engine on the asset includes providing a kill switch that breaks an ignition circuit.

13. The method in accordance with claim 1 wherein the step of providing a kill switch cooperating with the engine on the asset includes providing a kill switch that grounds an ignition circuit.

14. The method in accordance with claim 1 wherein the step of providing a kill switch cooperating with the engine on the asset includes providing a kill switch that shuts off an air intake.

15. The method in accordance with claim 1 wherein the step of providing a kill switch cooperating with the engine on the asset includes providing a kill switch that shuts off an electric fuel pump.

16. The method in accordance with claim 1 wherein the step of providing a kill switch cooperating with the engine on the asset includes providing a kill switch that operates in series with a manual kill switch on the asset.

17. The method in accordance with claim 1 wherein the step of providing a kill switch cooperating with the engine on the asset includes providing a kill switch that operates in series with a discrete kill switch operated by a vehicle security system.

18. The method in accordance with claim 1 wherein the step of providing a kill switch cooperating with the engine on the asset includes providing a kill switch that operates a relay that is also operated by a vehicle security system.

19. The method in accordance with claim 1 wherein the step of providing a kill switch cooperating with the engine on the asset includes providing a kill switch that operates a relay that is also operated by a discrete manual switch.

20. The method in accordance with claim 1 wherein the kill switch makes a vehicle computer inoperative.

21. Apparatus for protecting an associated asset having engine which includes:
   a kill switch cooperating with the engine on the associated asset;
   a communications receiver connected to the kill switch;
   a security system having a security panel for an associated protected premises; and
   a communications transmitter connected to the security panel, said apparatus thereby allowing a signal to be transmitted sequentially from the security panel to the transmitter, then to the receiver and then to the kill switch to cause operation of the kill switch.

22. The apparatus in accordance with claim 21 wherein the signal activates the kill switch to prevent operation of the engine.

23. The apparatus in accordance with claim 21 wherein the signal deactivates the kill switch to allow operation of the engine.

24. The apparatus in accordance with claim 21 wherein said communications receiver and said communications transmitter are respectively a radio frequency communications receiver and a radio frequency communications transmitter.

25. The apparatus in accordance with claim 21 wherein said kill switch is installed on an asset intended for operation on a highway.

26. The apparatus in accordance with claim 21 wherein said asset on which said kill switch is installed is a car.

27. The apparatus in accordance with claim 21 wherein said asset on which said kill switch is installed is a truck.

28. The apparatus in accordance with claim 21 wherein the said asset on which said kill switch is installed is a construction machine.

29. The apparatus in accordance with claim 21 wherein said asset is positioned within protected premises prior to operation of said kill switch.

30. The apparatus in accordance with claim 21 wherein said asset is positioned outside of protected premises prior to operation of said kill switch.

31. The apparatus in accordance with claim 21 wherein said kill switch causes an ignition shut off.

32. The apparatus in accordance with claim 21 wherein said kill switch breaks an ignition circuit.

33. The apparatus in accordance with claim 21 wherein said kill switch grounds an ignition circuit.

34. The apparatus in accordance with claim 21 wherein said kill switch shuts off an air intake.

35. The apparatus in accordance with claim 21 wherein said kill switch shuts off an electric fuel pump.

36. The apparatus in accordance with claim 21 wherein said kill switch is connected in series with a manual kill switch on the asset.

37. The apparatus in accordance with claim 21 wherein said kill switch is connected in series with a discrete kill switch operated by a vehicle security system.

38. The apparatus in accordance with claim 21 wherein said kill switch operates a relay that is also operated by a vehicle security system.

39. The apparatus in accordance with claim 21 wherein said kill switch operates a relay that is also operated by a discrete manual switch.

40. The apparatus in accordance with claim 21 wherein said kill switch is connected in parallel with a discrete kill switch operated by vehicle security system.

41. The apparatus in accordance with claim 21 wherein said kill switch is connected in parallel with another kill switch that is manually operated.

42. The apparatus in accordance with claim 21 wherein said kill switch cooperates with an associated computer in the vehicle and places the computer in a sleep mode.

43. The method in accordance with claim 1 including the method of placing the vehicle computer in sleep mode in response to actuation of a kill switch.

* * * * *